3,322,806
ALUMINUM ALKYLS FROM NON-ALPHA OLEFINS
Friedrich Asinger, Merkstein, Bernhard Fell and Rainer Janssen, Aachen-Laurensberg, Guenter Zoche, Beuel, Ernst Willi Mueller, Saint Augustin, and Friedrich W. A. G. K. Korte, Hangelar, Germany, assignors to Shell Oil Company, New York, N.Y., a corporation of Delaware
No Drawing. Filed May 13, 1963, Ser. No. 280,098
Claims priority, application Great Britain, May 16, 1962, 18,856/62; Dec. 19, 1962, 48,024/62
10 Claims. (Cl. 260—448)

This invention relates to the preparation of primary alcohols from internal olefins. More specifically, it relates to the catalytically accelerated reaction of aluminum trialkyls with non-α-olefins and the subsequent conversion of the resulting exchanged aluminum trialkyls to corresponding alcohols.

Higher normal primary alcohols are particularly useful as detergent intermediates. They may be obtained through a series of reactions, the first of which involves the production of suitable aluminum alkyls by reacting higher olefin with aluminum tri(lower alkyl), e.g., aluminum triisobutyl. The higher olefin "displaces" one or more of the lower alkyls. Subsequent oxidation of the resulting aluminum trialkyl with, for instance, air produces the alkoxide which in turn can be hydrolyzed with, e.g., water or dilute acid to obtain the higher primary alcohol. This process for the production of primary alcohols has been limited by the fact that the initial displacement reaction between the lower aluminum alkyls and the higher olefins only proceeds at a satisfactory rate when the olefin involved is an α-olefin. Displacement with a non-α-olefin has been too slow for practical use.

It is, therefore, a principal object of the present invention to provide an efficient and economical method for effecting exchange between aluminum trialkyls and non-α-olefins and to produce primary alcohols from the non-α-olefins.

These and other objects will be better understood from the description of the invention as given hereinafter.

Now, in accordance with this invention, it has been found that non-α-olefins readily react with aluminum alkyls in the presence of certain materials which catalyze the reaction. It has now been found that compounds of certain transition metals catalyze the reaction to such a degree that use of non-α-olefins in the displacement reaction becomes commercially feasible. The process comprises therefore reacting a non-α-olefin with an aluminum lower alkyl in the presence, as catalyst, of a compound of a metal of groups IV–B, V–B, or VI–B of the periodic table of elements that is a metal on the left hand side of Groups IV, V, and VI of the table given, for example, on pages 54 and 55 of Lange "Handbook of Chemistry," 10th edition (1961), McGraw-Hill Book Company.

By "aluminum lower alkyl" is meant an aluminum alkyl of which all the alkyl groups have fewer carbon atoms than the non-α-olefin employed in the process. The aluminum lower alkyl may be an aluminum alkyl hydride. In that case, the non-α-olefin converts the aluminum hydride group to an aluminum alkyl group.

Catalysts with which surprisingly good results have been obtained include compounds of zirconium, uranium, vanadium, chromium, thorium, and tungsten, with titanium being especially preferred. The catalyst may be added to the reactants in various forms, e.g., as a halide, especially a chloride such as titanium tetrachloride.

Further improvement has been found to result if the group IV–B to VI–B metal catalyst is added in the form of a compound containing an oxygen atom linking the metal with a carbon atom, such as alcoholate, phenolate or a chelate. Suitable compounds of this type are the methylates ethylates, propylates, isopropylates, phenolates, cresolates, acetylacetonates, salicylates, benzoylacetonates, and 2-furoylacetonates, with alcoholates and chelates of β-diketones such as the acetylacetonates being the most preferred.

Examples of the aluminum lower alkyls starting materials contemplated by this invention are aluminum triethyl, -tripropyl, -tri-n-butyl, -triisobutyl, -diisobutylmonochloride, and -diethylhydride, the preferred compounds having alkyl groups containing fewer than five carbon atoms. A particularly preferred starting material is aluminum triisobutyl.

The non-α-olefins, also called internal olefins, to be used in accordance with this invention contain a number of carbon atoms which is greater than the number of carbon atoms of any of the alkyl groups of the aluminum low alkyl. Suitable non-α-olefins include: butene-2, pentene-2, hexene-2, or -3, octene-2, -3 or -4, decene-5 and tridecene-6. These may be obtained by, e.g., the dehydration of suitable alcohols or alcohol mixtures. Advantageously, a mixture of technical non-α-olefins is used, which preferably contains at least 6 carbon atoms per molecule. It is to be understood that where a mixture of olefins is used, such as a mixture of technical olefins obtained by distillation, a small proportion of shorter chain length olefins may be present which are of a chain length equal to or less than that of one or more of the alkyl groups of the aluminum alkyl. Therefore, included in this invention is the use of olefin mixtures containing shorter chain length olefins, provided that these shorter chain olefins do not predominate.

Technical olefins having a high α-olefin content may be obtained by thermal or catalytic cracking of hydrocarbon feedstocks, e.g., the wax fractions produced in dewaxing luboils, or the raffinate obtained by the selective solvent extraction of heavy catalytically cracked cycle oil, or the n-paraffins separated from straight-run kerosene and gas-oil fractions by urea or molecular sieve fractionation to lower the pour point. Such olefins are usually fractionated into distillation cuts containing e.g. $C_6$–$C_8$, $C_9$–$C_{13}$, $C_{12}$–$C_{16}$, and $C_{14}$–$C_{18}$ olefins. The α-olefins in such mixtures are much more reactive than the non-α-olefins. Thus, when polymerizing such olefin mixtures, the α-olefins react preferentially and the non-α-olefin content in the unreacted olefinic residue increases extensively. Thus a product may be fractionated from this residue which is predominantly internal olefin and particularly useful in this invention.

In the practice of this invention, the molar ratio of non-α-olefin to the relatively low molecular weight alkyl aluminum may suitably vary from 1.5:1 to 10:1 or more. By non-α-olefin is meant an olefinic hydrocarbon or a mixture of such hydrocarbons having the olefinic double bond in a position other than a terminal one in a substantial proportion of the molecules, in particular one in which at least 40% of the molecules and preferably at least 60%, have the olefinic double bond in a non-terminal position.

In carrying out the process, the compound of the Group IV–B, V–B or VI–B metal is added to the reaction mixture in catalytic amounts, i.e., in an amount which may vary from, e.g., 0.05 to 10 mole percent, in particular from 0.5 to 5 mole percent, based on the amount of relatively lower alkyl aluminum compound employed. Smaller or larger amounts may be used, of course, if desired. Suitably the catalyst may be mixed with the olefin after which the relatively low alkyl aluminum compound is added.

Suitable reaction conditions for the preparation of aluminum alkyls acording to the invention includes temperatures from 50° to 250° C., preferably from 100° to 150° C., the reaction being conveniently carried out under an inert atmosphere, such as argon. It has been found that at high temperatures smaller amounts of catalyst and shorter reaction times are required. Thus, it has been found that at reaction temperatures between 150° and 200° the optimal amount of catalyst can be decreased to 0.1–2 mole percent. A reaction time of 5–10 hours will generally be sufficient at temperatures between 100° and 150° C., while between 150° and 200° C. reaction times of ½–5 hours may be used. At temperatures above 180° C. some catalyst systems tend to decompose.

Although atmospheric pressure is preferred, variations in pressure have no adverse effect on the reaction; subatmospheric or superatmospheric pressures can be used.

The aluminum alkyl produced according to the invention can be converted into a variety of derivatives by reaction with, e.g., $SO_2$, producing sulphinic acids, or with $CO_2$, resulting in the formation of carboxylic acids. Preferably the aluminum alkyls are oxidized, e.g., with oxygen, to form the corresponding aluminum alcoholates. Subsequently the alcoholates are hydrolyzed to form the corresponding primary alcohols.

The following specific example of the invention will serve to illustrate more clearly the application of the invention, but it is not to be construed as in any manner limiting the invention thereto:

*Example I*

The olefin starting material was prepared by dehydration of n-octanol-1 over 100% phosphoric acid. It contained less than 10% octene-1, the remainder being non-α-octenes. These octenes and aluminum triisobutyl were mixed in the molar ratios, indicated in Table I, at room temperature in a three-neck flask flushed with argon and provided with a reflux condenser, stirrer and gas inlet tube. Subsequently, $TiCl_4$ was added drop by drop. A vigorous reaction took place while the reaction mixture became dark brown and the temperature rose 5° C. The mixture was heated to 105°–135° C. and stirred for a period as indicated in Table I. Evolved isobutene was collected in a cold trap (−80° C.). The reaction mixture was completely oxidized by bubbling air through it, then hydrolyzed with 10% aqueous hydrochloric acid. After separation of the organic phase the aqueous phase was twice extracted with ether. The organic phase and the extracts were dried over sodium sulphate. The ether, isobutanol and octenes were distilled off employing a short rectifying column. The residue was vacuum-distilled yielding a fraction boiling at 92–95° C. containing octanol-1 as determined by gas chromatography.

Table I contains a summary of the data from the foregoing example (Run 1) as well as from Runs 2–14 in which molar ratios and conditions were varied as indicated. Control Run $x$ was conducted in the absence of the transition metal catalyst.

The use of octene-1 as the starting olefin under the above conditions resulted in the formation of no octanol, the product obtained being a rubbery mass, resulting from polymerization of the α-olefin.

TABLE I

| Example | Al-tri-isobutyl, mole | Catalyst $TiCl_4$, mole | Octenes | Isobutene collected, percent [a] | Reaction Time, hrs. | Reaction Temp., ° C. | Yield of Octanols, percent [b] | Yield of Octanol-1, percent [c] |
|---|---|---|---|---|---|---|---|---|
| (x) | 0.198 | | [d] 0.595 | 15.4 | 9 | 105 | 12.6 | 12.3 |
| 1 | 0.198 | 0.0045 | [d] 0.595 | 50.5 | 9 | 110 | 27.8 | 86.0 |
| 2 | 0.198 | 0.00089 | [d] 0.595 | 41.0 | 17 | 110 | 25.9 | 80.6 |
| 3 | 0.198 | 0.0089 | [e] 0.595 | 59.3 | 16 | 111 | 40.5 | 92.7 |
| 4 | [f] 0.277 | 0.0045 | [d] 0.831 | | 8 | 105 | 26.9 | 79.4 |
| 5 | 0.198 | [g] 0.018 | [d] 0.594 | | 8 | 110 | 31.0 | 82.2 |
| 6 | 0.198 | [h] 0.013 | [d] 0.594 | | 15 | 108 | 38.8 | 88.7 |
| 7 | 0.198 | 0.045 | [d] 0.594 | | 7 | 110 | 27.8 | 89.5 |
| 8 | 0.117 | 0.0045 | [e] 0.352 | | 8 | 130 | 36.3 | 87.3 |
| 9 | 0.117 | 0.0045 | [e] 0.352 | | 8 | 135 | 46.7 | 88.5 |
| 10 | 0.117 | 0.0045 | [e] 0.352 | | 8 | 110 | 37.9 | 88.5 |
| 11 | 0.117 | 0.0045 | [e] [i] 0.352 | | 8 | 110 | 27.8 | 74.8 |
| 12 | 0.117 | 0.0045 | [j] 0.704 | | 8 | 110 | 33.0 | 83.5 |
| 13 | 0.234 | 0.0045 | [j] 0.352 | | 8 | 110 | 37.0 | 84.5 |
| 14 | 1.66 | 0.045 | [d] 5.0 | | 8 | 110 | 41.7 | 95 |

[a] Based on aluminum triisobutyl, isobutane collected in cold trap.
[b] Based on octenes charged.
[c] Based on octenes converted.
[d] Octenes obtained by dehydration of octanol-1 over phosphoric acid.
[e] Octene-2 obtained by Grignard reaction of crotyl chloride with butyl chloride.
[f] Diisobutylaluminum hydride.
[g] 2 ml. $TiCl_4$ added dropwise during reaction.
[h] Catalyst added in two portions.
[i] 50 ml. toluene added.
[j] Trans-n-octene-4.

*Example II*

In the following series of experimental Runs 15–46 as set out in Table II below, the olefin starting material was prepared by dehydration of a straight chain octanol, e.g., n-octanol-1 over 100% phosphoric acid. For purposes of comparison, no catalyst was employed in Run Y. The resulting octene product contained about 2% octene-1, the remainder being non-α-octenes. 0.595 mol of this mixture of octenes, the catalyst (indicated in Table II) and subsequently 0.198 mol of aluminum triisobutyl were mixed at room temperature in a three-neck flask flushed with nitrogen and provided with a reflux condenser, cold trap, stirrer and gas inlet tube. A reaction took place during which the reaction mixture became dark brown and the temperature rose 5° C. The mixture was heated to a specified temperature and stirred for a specified time as indicated in Table II. Isobutene was collected in the cold trap (−80° C.). The reaction mixture was completely oxidized by bubbling air through it and then hydrolyzed with 10% hydrochloric acid. After separation of the organic phase the aqueous phase was twice extracted with ether. The former phase and the extracts were dried over sodium sulphate. The ether, isobutanol and octenes were distilled off employing a short rectifying column. In the residue the octanol-1 content was determined by gas chromatography.

TABLE II

| Example | Catalyst | Amount of Cat. Mol | Amount of Cat. Mol percent[a] | Time, hrs. | Temp., °C. | Yield of Octanol-1,[b], mol percent |
|---|---|---|---|---|---|---|
| Y | No catalyst | | | 9 | 105 | 1.6 |
| 15 | TiCl₄ | 0.0045 | 2.3 | 9 | 110 | 24 |
| 16 | (C₂H₅O)₃TiCl | 0.0045 | 2.3 | 7 | 110 | 38 |
| 17 | Ti(OC₂H₅)₄ | 0.0045 | 2.3 | 7 | 110 | 48 |
| 18 | Ti(OCH₃)₄ | 0.0045 | 2.3 | 7 | 110 | 48 |
| 19 | Ti(O-iso-C₃H₇)₄ | 0.0045 | 2.3 | 7 | 110 | 44 |
| 20 | Ti(OC₂H₅)₄ | 0.0240 | 12.1 | 7 | 110 | 30 |
| 21 | Ibid | 0.0097 | 4.9 | 7 | 110 | 44 |
| 22 | Ibid | 0.0073 | 3.7 | 7 | 110 | 47 |
| 23 | Ibid | 0.0059 | 3.0 | 7 | 110 | 60 |
| 24 | Ibid | 0.0048 | 2.4 | 7 | 110 | 55 |
| 25 | Ibid | 0.0045 | 2.3 | 7 | 110 | 48 |
| 26 | Ibid | 0.0005 | 0.25 | 7 | 110 | 39 |
| 27 | Ti(OC₂H₅)₄ | 0.0048 | 2.4 | 9 | 140 | 44 |
| 28 | Ibid | 0.0048 | 2.4 | 1 | 190 | [c]41 |
| 29 | Ibid | 0.0005 | 0.25 | 6 | 170 | 52 |
| 30 | Ibid | 0.0005 | 0.25 | 6 | 200 | 44 |
| 31 | CrCl₃ | 0.0063 | 3.2 | 9 | 110 | 8 |
| 32 | Cr(III)-acetylacetonate | 0.0045 | 2.3 | 7 | 110 | 30 |
| 33 | ZrCl₄ | 0.0043 | 2.2 | 7 | 110 | 33 |
| 34 | Zr(OC₂H₅)₄ | 0.0045 | 2.3 | 7 | 110 | 55 |
| 35 | Ibid | 0.0048 | 2.45 | 7 | 110 | 47 |
| 36 | UCl₄ | 0.0045 | 2.3 | 1[a]6 | 170 | 10 |
| 37 | U(OC₂H₅)₅ | 0.0045 | 2.3 | 7 | 110 | 40 |
| 38 | VCl₃ | 0.0045 | 2.3 | 7 | 110 | 29 |
| 39 | VOCl₃ | 0.0045 | 2.3 | 7 | 110 | 35 |
| 40 | V(III)acetylacetonate | 0.0045 | 2.3 | 7 | 110 | 50 |
| 41 | WCl₆ | 0.0045 | 2.3 | 7 | 110 | 6 |
| 42 | W(OC₆H₅)₆ | 0.0135 | 6.8 | 7 | 110 | 16 |
| 43 | Ta(OC₂H₅)₅ | 0.0045 | 2.3 | 7 | 110 | 40 |
| 44 | Nb(OC₂H₅)₅ | 0.0045 | 2.3 | 7 | 110 | 35 |
| 45 | NbCl₅ | 0.0045 | 2.3 | 7 | 110 | 27 |
| 46 | TiCl₃ | 0.0045 | 2.3 | 7 | 110 | 22 |

[a] Based on Al-tri-isobutyl charged.
[b] Based on octenes charged.
[c] Charged 1.19 mole octenes, 0.198 mole Al-triisobutyl.

*Example III*

A third series of experiments were carried out with the process described in Example I. The results are set out in Table III as experimental Runs 47–53.

TABLE III

| Example | Al-tri-isobutyl, mol | Octenes mol | Catalyst Type | Catalyst Mol | Reaction Time, hrs. | Reaction Temp., °C. | Yield of Octanols, percent[a] | Yield of Octanol-1, percent[b] |
|---|---|---|---|---|---|---|---|---|
| 47 | 0.117 | [c]0.352 | Zr(IV)-acetylacetonate | 0.001 | 9 | 113 | 35.9 | 91.3 |
| 49 | 0.117 | [c]0.352 | ZrCl₄ | 0.002 | 8 | 110 | 40.2 | 93.8 |
| 48 | 0.117 | [d]0.352 | ZrCl₄ | 0.0013 | 8 | 110 | 23.9 | 70.7 |
| 50 | 0.117 | [e]0.352 | Zr(IV)acetylacetonate | 0.001 | 8 | 110 | 31.3 | 86.5 |
| 51 | 0.117 | [f]0.352 | Ibid | 0.0041 | 8 | 110 | 42.4 | 95.9 |
| 52 | 0.117 | [f]0.352 | V(III)acetylacetonate | 0.0014 | 8 | 110 | 42.4 | 81.4 |
| 53 | 0.117 | [f]0.352 | Vanadyldiacetylacetonate | 0.0019 | 8 | 110 | 42.0 | 81.9 |

[a] Based on octenes charged.
[b] Based on octenes converted.
[c] Octene-2 obtained by Grignard reaction of crotyl chloride with butyl chloride.
[d] Trans-n-octene-4.
[e] Cis-n-octene-4.
[f] Octenes obtained by dehydration of octanol-1 over phosphoric acid.

The yields in Table I—III have been expressed in terms of the primary alcohol resulting after subsequent oxidation and hydrolysis of the higher molecular weight aluminum alkyl produced. The percent of conversion of the lower molecular aluminum alkyls would be even greater were the data based on the amount of higher aluminum alkyl obtained rather than on the primary alcohol formed.

We claim as our invention:

1. A process for the preparation of an aluminum n-alkyl which comprises reacting a linear non-α-olefin with a relatively low molecular weight aluminum alkyl compound in the presence of a catalyst comprising a compound of a metal of Group IV–B, V–B, or VI–B of the periodic table of the elements in an amount of 0.05 to 10 mole percent, based on the amount of said relatively low molecular weight aluminum alkyl compound employed.

2. A process in accordance with claim 1 in which the catalyst is a compound containing an oxygen atom linking the metal with a carbon atom.

3. A process in accordance with claim 2 in which the catalyst is an alcoholate.

4. A process in accordance with claim 1 in which the catalyst comprises titanium.

5. A process in accordance with claim 1 in which the relatively low molecular weight alkyl aluminum compound is aluminum triisobutyl.

6. A process in accordance with claim 1 in which the non-α-olefin contains at least 6 carbon atoms per molecule.

7. A process in accordance with claim 1 in which the non-α-olefin and the lower molecular weight alkyl aluminum compound are included in a molar ratio between 1.5:1 and 10:1.

8. A process in accordance with claim 1 in which the catalyst is added in an amount from 0.5 to 5% mol.

9. A process in accordance with claim 1 in which the reaction temperature is between 100° and 150° C.

10. A process in accordance with claim 1 in which the non-α-olefin is an olefinic reaction residue containing more than 40% non-α-olefins obtained by preferentially reacting the α-olefins of a collected hydrocarbon feed structure.

No reference cited.

TOBIAS E. LEVOW, *Primary Examiner.*